US012670735B2

(12) United States Patent
Siekmann et al.

(10) Patent No.: US 12,670,735 B2
(45) Date of Patent: Jun. 30, 2026

(54) METHOD AND APPARATUS FOR OPTICAL DETECTION AND ANALYSIS IN A MOVEMENT ENVIRONMENT

(71) Applicant: AIRIS GmbH, Bueren (DE)

(72) Inventors: Pascal Siekmann, Bueren (DE); Gerhard Dick, Lippstadt (DE)

(73) Assignee: AIRIS GmbH, Bueren (DE)

( * ) Notice: Subject to any disclaimer, the term of this patent is extended or adjusted under 35 U.S.C. 154(b) by 251 days.

(21) Appl. No.: 18/714,663

(22) PCT Filed: Dec. 16, 2022

(86) PCT No.: PCT/EP2022/086255
§ 371 (c)(1),
(2) Date: May 30, 2024

(87) PCT Pub. No.: WO2023/117723
PCT Pub. Date: Jun. 29, 2023

(65) Prior Publication Data
US 2025/0037482 A1 Jan. 30, 2025

(30) Foreign Application Priority Data

Dec. 22, 2021 (DE) .................... 10 2021 006 307.4

(51) Int. Cl.
*G06V 20/64* (2022.01)
*G06T 7/292* (2017.01)
(Continued)

(52) U.S. Cl.
CPC .............. *G06V 20/64* (2022.01); *G06T 7/292* (2017.01); *G06T 7/70* (2017.01); *G06V 10/147* (2022.01);
(Continued)

(58) Field of Classification Search
CPC ........ G06V 20/64; G06V 10/32; G06V 40/10; G06V 10/82; G06V 10/751; G06V 10/955;
(Continued)

(56) References Cited

U.S. PATENT DOCUMENTS 10,825,197 B2 * 11/2020 Hall ........................ G06T 17/00
11,468,636 B2 * 10/2022 Ge ............................ G06N 3/09
(Continued)

FOREIGN PATENT DOCUMENTS

DE 102020100366 A1 7/2021
GB 2589843 A 6/2021
WO WO 2021/099788 A1 5/2021

OTHER PUBLICATIONS

Zhang et al., "The study of calibration and epipolar geometry for the stereo vision system built by fisheye lenses", Proceedings vol. 9406, Intelligent Robots and Computer Vision XXXII: Algorithms and Techniques; 94060M (2015), pp. 1-10 (Year: 2015) (Year: 2015).*
(Continued)

*Primary Examiner* — Stephen S Hong
(74) *Attorney, Agent, or Firm* — William Gray Mitchell

(57) ABSTRACT

Provided is a device and a corresponding method for optical recognition and analysis, in particular of bodies, body parts and/or joints of a person, surfaces and objects in a 3-dimensional movement area in real time, with one or more cameras with fisheye lens, which are arranged at a distance and position from the movement area specifically selected for the application, for determining 2D positions of the bodies, body parts and/or joints, surfaces and objects by means of camera images, at least one data processing unit being provided, with devices for calculating neural networks and artificial intelligence in real time, for applying several AIs on captured camera images, and with at least one interface for one or more audio/video feedback units for outputting data
(Continued)

or audio/video feedback on the analysis results by means of the audio/video feedback unit.

19 Claims, 5 Drawing Sheets

(51) Int. Cl.
| | |
|---|---|
| *G06T 7/70* | (2017.01) |
| *G06V 10/147* | (2022.01) |
| *G06V 10/26* | (2022.01) |
| *G06V 10/32* | (2022.01) |
| *G06V 10/75* | (2022.01) |
| *G06V 10/82* | (2022.01) |
| *G06V 10/94* | (2022.01) |
| *G06V 40/10* | (2022.01) |

(52) U.S. Cl.
CPC .............. *G06V 10/26* (2022.01); *G06V 10/32* (2022.01); *G06V 10/751* (2022.01); *G06V 10/82* (2022.01); *G06V 10/955* (2022.01); *G06V 40/10* (2022.01); *G06T 2207/10016* (2013.01); *G06T 2207/20084* (2013.01); *G06T 2207/20132* (2013.01); *G06T 2207/30196* (2013.01)

(58) Field of Classification Search
CPC ...... G06V 10/147; G06V 10/26; G06T 7/292; G06T 7/70
See application file for complete search history.

(56) References Cited

U.S. PATENT DOCUMENTS

| | | | |
|---|---|---|---|
| 2011/0279368 A1 | 11/2011 | Klein | |
| 2021/0209788 A1* | 7/2021 | Kim | G06T 7/73 |
| 2021/0407037 A1* | 12/2021 | Varekamp | G06T 7/593 |
| 2021/0409648 A1* | 12/2021 | Kallakuri | G06T 7/70 |
| 2022/0084229 A1* | 3/2022 | Guizilini | G06T 3/18 |
| 2022/0198682 A1* | 6/2022 | Oh | G06T 7/75 |
| 2022/0321778 A1* | 10/2022 | Baheti | H04N 23/698 |
| 2022/0392014 A1* | 12/2022 | Narayanan | G05B 13/027 |
| 2023/0141515 A1* | 5/2023 | Danziger | H04N 13/122 |
| | | | 348/47 |
| 2024/0303859 A1* | 9/2024 | Nakamura | G06T 7/251 |
| 2024/0320860 A1* | 9/2024 | Liu | G06V 40/107 |
| 2025/0336086 A1* | 10/2025 | Park | G06F 18/00 |

OTHER PUBLICATIONS

Abraham et al., "Fish-eye-stereo calibration and epipolar rectification", ISPRS Journal of Photogrammetry & Remote Sensing 59 ( 2005) 278â 288 (Year: 2005) (Year: 2005).*
Fit4bike: "3d Motion Analysis: main features—Fit4Bike", XP9093020092, Gefunden im Internet: URL: https://www.youtube.com/watch?v=nGA8KbvxeBM, Nov. 11, 2015.
Anonymous: "Epipolar geometry—Wikipedia", Gefunden im Internet: URL: https://en.wikipedia.org/w/index.pho?title=Epipolar_geometry&oldid=101886710, Mar. 7, 2021.
WIPO PCT International Search Report and Written Opinion for priority application PCT/DE22/86255, Feb. 10, 2023.
GPO Search Report for priority application DE 102021006307, Aug. 4, 2022.

* cited by examiner

METHOD AND APPARATUS FOR OPTICAL DETECTION AND ANALYSIS IN A MOVEMENT ENVIRONMENT

CROSS REFERENCE TO RELATED APPLICATIONS

The present application claims priority to PCT/EP2022/086255, filed on Dec. 16, 2022, and thence to German patent application DE 102021006307 filed on Dec. 22, 2021. The aforementioned applications are hereby incorporated by reference in their entirety.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND OF THE DISCLOSURE

Field of the Disclosure

The present patent application relates generally to a method and an apparatus for optically recognizing and analyzing in particular bodies, body parts and/or joints of a human, surfaces and objects in 3-dimensional space in a movement environment as described by the independent patent claims.

In the smartphone age, lack of exercise is a well-known and growing problem. Already today, 16 percent of all adult Germans are considered obese and a further 53 percent are overweight. Obesity and a lack of exercise are often associated with illnesses such as cardiovascular disease, mental health problems and addiction. The "smartphone generation" in particular, i.e. young people and children, do not get enough exercise.

At the same time, modern working methods, robotics, computer-aided assembly, etc. are also creating movement spaces in which the movements of fitters, for example, have to be recorded and evaluated.

However, digital technology, which has brought us the smartphone, is not only the trigger, but also the solution to the "activity crisis" as well as the solution to recording tasks in work areas as described, whereby digital technologies such as self-tracking with wearables, i.e. IT elements that can be worn or integrated into clothing, but also augmented and virtual reality applications can play a major role.

For these approaches to work, motion analysis and feedback for augmented and virtual reality applications must take place in real time so that, for example, training and motion detection in the assembly area or similar can be effective. Appropriate sensor technology and data processing are essential for this.

In this context, for example, devices have been proposed which have a display surface, a movement or training area associated with the display surface, a sensor system, a detection system for detecting the position of objects and/or a player in at least part of the movement or training area and a computing unit.

The detection system can have a depth camera which is set up to record a two-dimensional or three-dimensional image of the movement space, with each pixel of the two-dimensional or three-dimensional image representing a distance value. The distance value can, for example, be the distance of a point of the object and/or the player to the depth camera. The depth camera can be set up to determine the distance by means of a time-of-flight measurement of an electromagnetic pulse. Alternatively, laser scanners or a touch-sensitive floor have been proposed for the detection system, whereby the laser scanner can be set up to determine a distance of a point of the object and/or the player to the laser scanner. The touch-sensitive floor can delimit the playing area at its lower end and be set up to determine the position of the object and/or the player by their contact with the touch-sensitive floor.

These methods and devices are generally complex and cost-intensive in order to achieve good accuracy and range and actually only provide 2D data. Furthermore, known systems are not real-time capable. There is therefore a need for methods and devices that are easy to install, operate and handle with a high detection accuracy and are inexpensive to manufacture, so that they are accepted on the market accordingly.

This problem and various preferred embodiments are taught by the disclosure below.

SUMMARY OF THE DISCLOSURE

In a preferred embodiment, a method for optical recognition and analysis, in particular of bodies, body parts and/or joints of a person, surfaces and objects in 3-dimensional space in a motion range in real time, comprising the following steps:

a. Provision of one or more cameras (2) with fisheye lens (3), b. Arrangement of the one or more cameras (2) at a distance and position from the movement area specifically selected for the application, c. Providing at least one data processing unit equipped with devices for calculating neural networks and artificial intelligences in real time, d. Provision of at least one audio/video feedback unit, e. Determination of 2D positions of bodies, body parts and/or joints, surfaces and objects using camera images on the respective camera or cameras (2), f. Application of several AIs to captured camera images for recognition and/or analysis with the steps i. Recognizing and cropping bodies/objects on camera images, ii. Recognizing body part/joint and/or object positions on image crops, iii. Determination of the 3-dimensional positions of the recognized body part, joint and/or object positions in the movement area, iv. Analyzing the movement of the 3-dimensional body part/joint and/or object positions in the movement area, g. Output of data or audio/video feedback on the analysis results using the audio/video feedback unit.

In another preferred embodiment, the method for optical recognition and analysis as described herein, wherein the determination of the 3-dimensional positions of the detected body part/joint and/or object positions in the range of motion is carried out by 3D real-time estimation.

In another preferred embodiment, the method for optical recognition and analysis as described herein, wherein at least two cameras (2) with fisheye lens (3) are provided and the determination of the 3-dimensional positions of the recognized body part, joint and/or object positions in the range of motion is carried out by triangulation.

In another preferred embodiment, the method for optical recognition and analysis as described herein, wherein the at least one camera with fisheye lens has a diagonal field of view (FOV) of at least 220°.

In another preferred embodiment, the method for optical recognition and analysis as described herein, wherein the at least one camera with a fisheye lens has a field of view of up to 180° horizontally and 180° vertically.

In another preferred embodiment, the method for optical recognition and analysis as described herein, wherein the distance and position of the one or more cameras specifically selected for the application is chosen to cover the area in front of the camera or cameras in a radius of up to 10 meters.

In another preferred embodiment, the method for optical recognition and analysis as described herein, wherein the AIs comprise object recognition AIs and wherein determining 2D positions of the bodies, body parts, joints and/or surfaces and objects in the range of motion by camera images on the respective camera or cameras comprises the following steps:

a. Preparation of the camera images for input into the object recognition AI by reducing the size of the images using GPU (Graphic Processor Unit) acceleration, b. Cropping of bodies, joints, body parts and/or objects, correction of the orientation and scaling of the image section size using GPU acceleration, c. Recognition of body part and/or joint positions on the image sections of the bodies by means of further object recognition AIs that are trained to recognize body parts and joints, and d. Reverse calculation of the detected 2D body parts and/or joint points to the original image size and orientation of the camera image.

In another preferred embodiment, the method for optical recognition and analysis as described herein, wherein, when using several cameras, the body parts and joints are additionally recognized by means of feature matching, wherein the joint points recognized by the AIs are searched for by a first camera by means of feature matching on all further cameras.

In another preferred embodiment, the method for optical recognition and analysis as described herein, wherein the projection of the epipolar line of the first camera is calculated on all further cameras to minimize the computational effort and areas to be analyzed are defined, wherein the feature matching of the respectively detected joint point takes place along these epipolar line areas.

In another preferred embodiment, the method for optical recognition and analysis as described herein, wherein the recognition of 3-D surfaces is carried out using a further AI, which receives two camera images as input and creates a spatial model from them.

In another preferred embodiment, the method for optical recognition and analysis as described herein, wherein the object recognition AI is provided with data on the relations of human joints to each other and performs a pose correction.

In another preferred embodiment, the method for optical recognition and analysis as described herein, wherein the cameras (2) are arranged such that their fields of view intersect.

In another preferred embodiment, the method for optical recognition and analysis as described herein, wherein a second data processing unit with graphics processors is provided for controlling games and sports programs based on the 3D data with the body, joints, objects, surfaces and for displaying the feedback by means of the audio/video feedback unit.

In another preferred embodiment, the device for carrying out a method for optical recognition and analysis, in particular of bodies, body parts and/or joints of a person, surfaces and objects in the 3-dimensional motion range in real time, comprising:

a. a housing (34)

b. one or more cameras (2) with fisheye lens (3), which are arranged in the housing (34) at a distance and position from the movement area specifically selected for the application, for determining 2D positions of the bodies, body parts and/or joints, surfaces and objects in the motion area by means of camera images;

c. at least one data processing unit provided with means for calculating neural networks and artificial intelligences in real time, for applying several AIs to captured camera images for recognition and/or analysis, comprising the steps of i. Recognising and cropping bodies/objects on camera images ii. Recognition of body parts, joints and/or object positions on image sections iii. Determination of the 3-dimensional positions of the recognized body part, joint and/or object positions iv. Analysis of the movement of the 3-dimensional body part, joint and/or object positions, and d. at least one interface (36) for one or more audio/video feedback units for outputting data or audio/video feedback on the analysis results by means of the audio/video feedback unit.

In another preferred embodiment, the device as described herein, wherein the AIs comprise object recognition AIs for determining 2D positions of the bodies, body parts, joints and/or surfaces and objects by camera images on the respective camera or cameras (2) by means of the following steps:

a. Preparation of the camera images for input into the object recognition AI, by reducing the size of the images using GPU (Graphic Processor Unit) acceleration, b. Cropping of bodies, joints, body parts and/or objects, correction of the orientation and scaling of the image section size using GPU acceleration, c. Recognition of body part and/or joint positions on the image sections of the bodies by means of further object recognition AIs that are trained to recognize body parts and joints, and d. Reverse calculation of the detected 2D body part and/or joint points to the original image size and orientation of the camera image.

In another preferred embodiment, the device as described herein, wherein at least two cameras (2) with fisheye lens (3) are provided for determining the 3-dimensional positions of the recognized body part, joint and/or object positions in the motion range by triangulation.

In another preferred embodiment, the device as described herein, wherein the at least one camera (2) with fisheye lens (3) has a diagonal field of view (FOV) of up to 220°.

In another preferred embodiment, the device as described herein, wherein the at least one camera (2) with fisheye lens (3) has a field of view of up to 180° horizontally and 180° vertically.

In another preferred embodiment, the device as described herein, wherein the distance and position of the one or more cameras (2) in the housing (34) specifically selected for the application is chosen to cover the movement space in front of the one or more cameras (2) in a radius of up to 10 meters.

In another preferred embodiment, the device as described herein, wherein the object recognition AI is provided with data on the relations of human joints to each other and performs a pose correction.

In another preferred embodiment, the device as described herein, wherein the cameras (2) are arranged in the housing in such a way that their fields of view intersect.

Still other aspects, features, and advantages of the present disclosure are readily apparent from the following detailed description, simply by illustrating preferable embodiments and implementations. The present disclosure is also capable of other and different embodiments and its several details can be modified in various obvious respects, all without departing from the spirit and scope of the present disclosure. Accordingly, the drawings and descriptions are to be regarded as illustrative in nature, and not as restrictive. Additional objects and advantages of the disclosure will be set forth in part in the description which follows and in part will be obvious from the description, or may be learned by practice of the disclosure.

BRIEF DESCRIPTION OF THE DRAWINGS

The disclosure will be described based on figures. It will be understood that the embodiments and aspects of the disclosure described in the figures are only examples and do not limit the protective scope of the claims in any way. The disclosure is defined by the claims and their equivalents. It will be understood that features of one aspect or embodiment of the disclosure can be combined with a feature of a different aspect or aspects of other embodiments of the disclosure, in which:

DETAILED DESCRIPTION OF THE DISCLOSURE

Figures 1A, 1B:
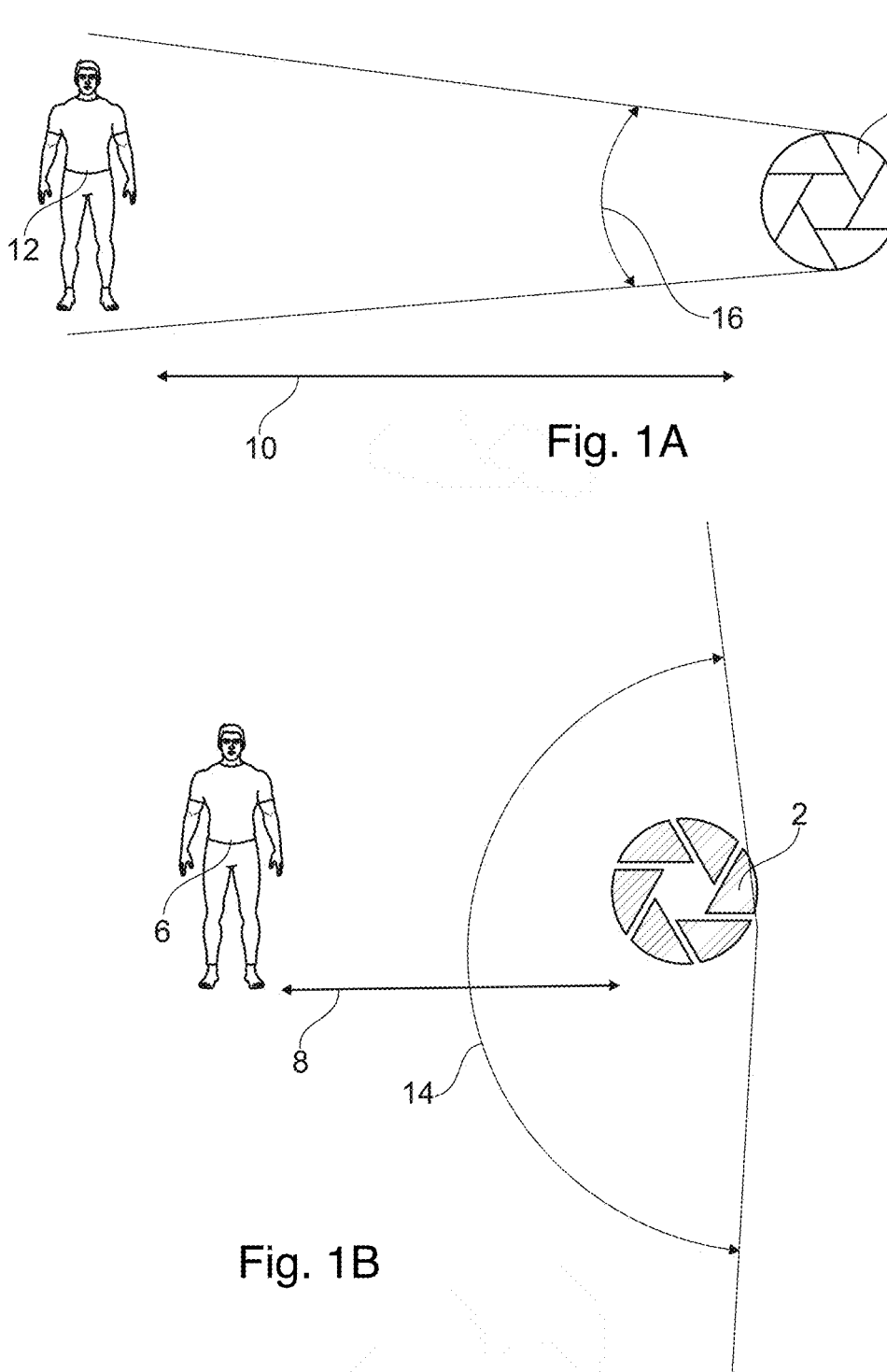
FIGS. 1A and 1B show the capturing of a person in the training area through a fisheye lens compared to a camera with a normal lens.

The technical problem and further specific embodiments are covered by this disclosure.

What is provided is a method for the optical recognition and analysis, in particular of bodies, body parts and/or joints of a person, surfaces and objects in 3-dimensional space in a movement area or space, such as a training area, an assembly area or the like, in real time, comprising the steps of:

a. Provision of one or more cameras with fisheye lens,
  b. Arrangement of the one or more cameras at a distance and position from the movement area specifically selected for the application, c. Providing a data processing unit equipped with devices for calculating neural networks and artificial intelligences in real time,
  d. Provision of an audio/video feedback unit,
  e. Determination of 2D positions of bodies, body parts and/or joints, surfaces and objects using camera images on the respective camera or cameras,
  f. Application of several AIs to the captured camera images for recognition and/or analysis with the steps,
    i. Recognizing and cropping bodies/objects on camera images
    ii. Recognition of body part/joint and/or object positions on image sections,
    iii. Determination of the 3-dimensional positions of the detected body part/joint and/or object positions,
    iv. Analysis of the movement sequences of the 3-dimensional body part, joint and/or object positions,
  g. Output of data or audio/video feedback on detection/analysis results using the audio/video feedback unit.

Fisheye cameras, or cameras equipped with a fisheye lens, are used so that objects to be recognized can be fully viewed from as close a distance as possible. In contrast, normal camera lenses must be further away from the object to be recognized in order to view it fully.

By providing fisheye cameras in the method according to the invention, it is possible, for example in the home or in spatially limited working environments, to recognize people who are also close to the system on which the method is running and to carry out the method, which is significantly more space-saving than known approaches as described above.

The received camera image is heavily distorted by the fisheye lens. However, an AI can see an entire room due to the presence of fisheye cameras or cameras equipped with a fisheye lens, which makes it possible, among other things, to analyze running in the user's training and the like. The cameras, and therefore the AIs, also see everything that happens to the sides of them. A "dead zone" is therefore only present behind the cameras, which means that no additional, expensive cameras or sensors are required to additionally detect the blind spots.

Whether the focus of the AIs is on detecting people and objects and on detecting the orientation of the person or object or on detecting body parts and joints depends on whether a person has already been tracked as part of the procedure or whether a previously tracked person has left the tracking area or the training field. If a person has previously been tracked who is in the area of the training field, the position and orientation of the person are generated from the AI with a focus on recognizing body parts and joints.

The method is also preferably designed in such a way that the artificial intelligences check each other for plausibility in order to increase the frequency and accuracy of recognition.

If only one camera with a fisheye lens is provided in the method, the 3-dimensional positions of the detected body part/joint and/or object positions are determined by 3D real-time estimation.

Alternatively, at least two cameras with a fisheye lens can be provided, whereby the 3-dimensional positions of the detected body part, joint and/or object positions are determined by triangulation. Preferably, the 2-N cameras are arranged at a distance of 28 cm, whereby this distance can be varied as required in order to increase or decrease the accuracy.

Preferably, the at least one camera with a fisheye lens has a diagonal field of view (FOV) of 220° or more. Further preferably, the at least one camera with a fisheye lens has a field of view of up to 180° horizontally and 180° vertically.

The distance and position of the one or more cameras specifically selected for the respective application is preferably chosen to cover the area in front of the camera or cameras within a radius of up to 10 meters.

The AIs preferably comprise object recognition AIs, wherein the determination of 2D positions of the bodies, body parts, joints and/or surfaces and objects by camera images on the respective camera or cameras further comprises the following steps:

a. Preparation of the camera images for input into the object recognition AI, by reducing the size of the images using GPU (Graphic Processor Unit) acceleration, b. Cropping of bodies, joints, body parts and/or objects, correction of the orientation and scaling of the image section size using GPU acceleration, c. Recognition of body part and/or joint positions on the image sections of the bodies by means of further object recognition AIs, which are trained to recognize body parts and joints, d. Reverse calculation of the detected 2D body parts and/or joint points to the original image size and orientation of the camera image;

e. With several cameras, additional recognition of the body parts and joints by means of feature matching, whereby the joint points recognized by the AIs of a first camera are searched for on all other cameras by means of feature matching. To minimize the computational effort, the projection of the epipolar line of the first camera is calculated on all other cameras. By knowing the area(s) to be analyzed, the length of these epipolar lines can also be greatly reduced. The feature matching of the recognized joint point now only takes place along these epipolar line areas or sections. Incorrect AI estimates can be corrected and stabilized using this additional information about the position of the 2D joint points.

If two cameras are provided, 3D surfaces are preferably recognized by another AI, which receives two separate camera images as input and creates a spatial model from them, whereby an accuracy of the 3D position of bodies, body parts, joints, surfaces and objects of <=30 cm is achieved in real time.

Furthermore, the object recognition AI is preferably provided with data on the relationships between human joints and performs a pose correction.

If more than one camera is provided, these are preferably arranged in such a way that their fields of view intersect.

Furthermore, a second data processing unit with graphics processors can be provided to provide games and game and sports programs and to enable training based on the 3D data, in particular to control the games or sports programs with the body and/or joints and to receive feedback (via video and audio).

The method according to the invention can also be characterized by the fact that the AIs forward images, data and results of the analysis to an Internet cloud. Here, clones of the AIs can be trained in order to increase the accuracy of the entire system for the future, whereby the data in the cloud can also be used to make results available on other platforms.

With the method according to the present invention, a processing speed of <=150 ms is achieved until the results are displayed via an HMI (Human Machine Interface), whereby the results can be made available on a video/audio output or via various data interfaces (e.g. Bluetooth, LAN, . . . ).

With the method according to the invention, the user can also be provided with additional use cases, such as a mirror image of himself, by means of another additional mirror camera, i.e. another camera that is not one of the aforementioned cameras and to whose images the AIs are not applied. With the help of this mirror camera, the user can see himself live and have the results displayed in real time on his mirror image/live video.

Also provided is a training device for carrying out a method for optical recognition and analysis as described above, with one or more cameras with a fisheye lens, which are arranged at a distance and position from the training area specifically selected for the application, for determining 3D positions of the bodies, body parts and/or joints, surfaces and objects by means of camera images, wherein at least one data processing unit is provided, with means for calculating neural networks and artificial intelligence in real time, for applying several AIs to captured camera images for recognition and/or analysis according to the described method, and with at least one interface for one or more audio/video feedback units for outputting data or audio/video feedback on the analysis results by means of the audio/video feedback unit. The device can have all the features that have already been described in connection with the method. All elements are preferably arranged in a single housing for easy handling by the user.

DETAILED DESCRIPTION OF THE DRAWINGS

FIGS. 1A and 1B show a schematic comparison of how a person in the training area is captured by a fisheye lens 2 compared to a camera with a normal lens 4.

The fisheye cameras 2, or cameras equipped with a fisheye lens 2, are used so that objects to be recognized, in this case a person 6, can be fully viewed from the smallest possible distance 8. In contrast, normal camera lenses 4 must be at a greater distance 10 from the object 12 to be recognized in order to view it fully. The fisheye camera has a significantly larger field of view 14 than the field of view 16 of the normal camera. As a result, the fisheye camera 2 can see an entire room, whereas a camera 4 cannot capture what is happening to the side of it.

Figure 2B:
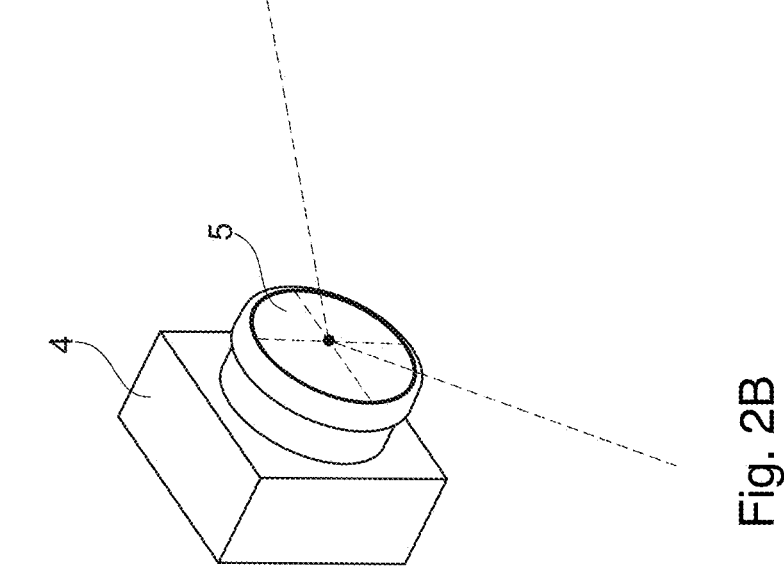
FIGS. 2A and 2B show the representation of a camera with fisheye and without fisheye.
Figure 2A:
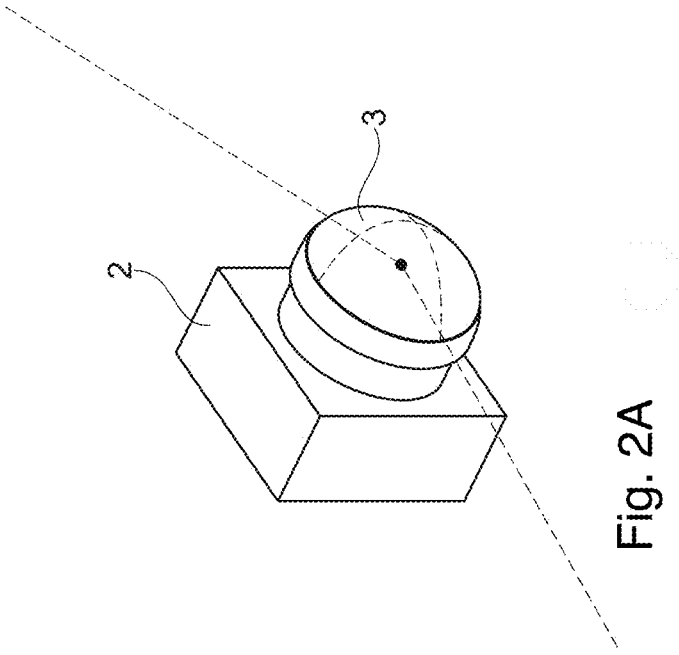

FIGS. 2A and 2B show in greater detail the schematic representation of the camera 2 with fisheye lens 3 and the camera 4 with a non-fisheye lens 5. In contrast to conventional non-fisheye lenses 5, which proportionally image an object plane perpendicular to the optical axis, fisheye lenses 3 image one hemisphere or more, with clear but not excessive distortions, on the image plane. Straight lines that do not run through the center of the image are curved; the image is strongly barrel-shaped. Area ratios or radial distances are usually reproduced more faithfully than with an ordinary, gnomonically projecting wide-angle lens 5. The fisheye lens 3 has a very large image angle (shown here as a dashed line) of 180° or more, which cannot be achieved with the conventional projection method.

Figure 3A:
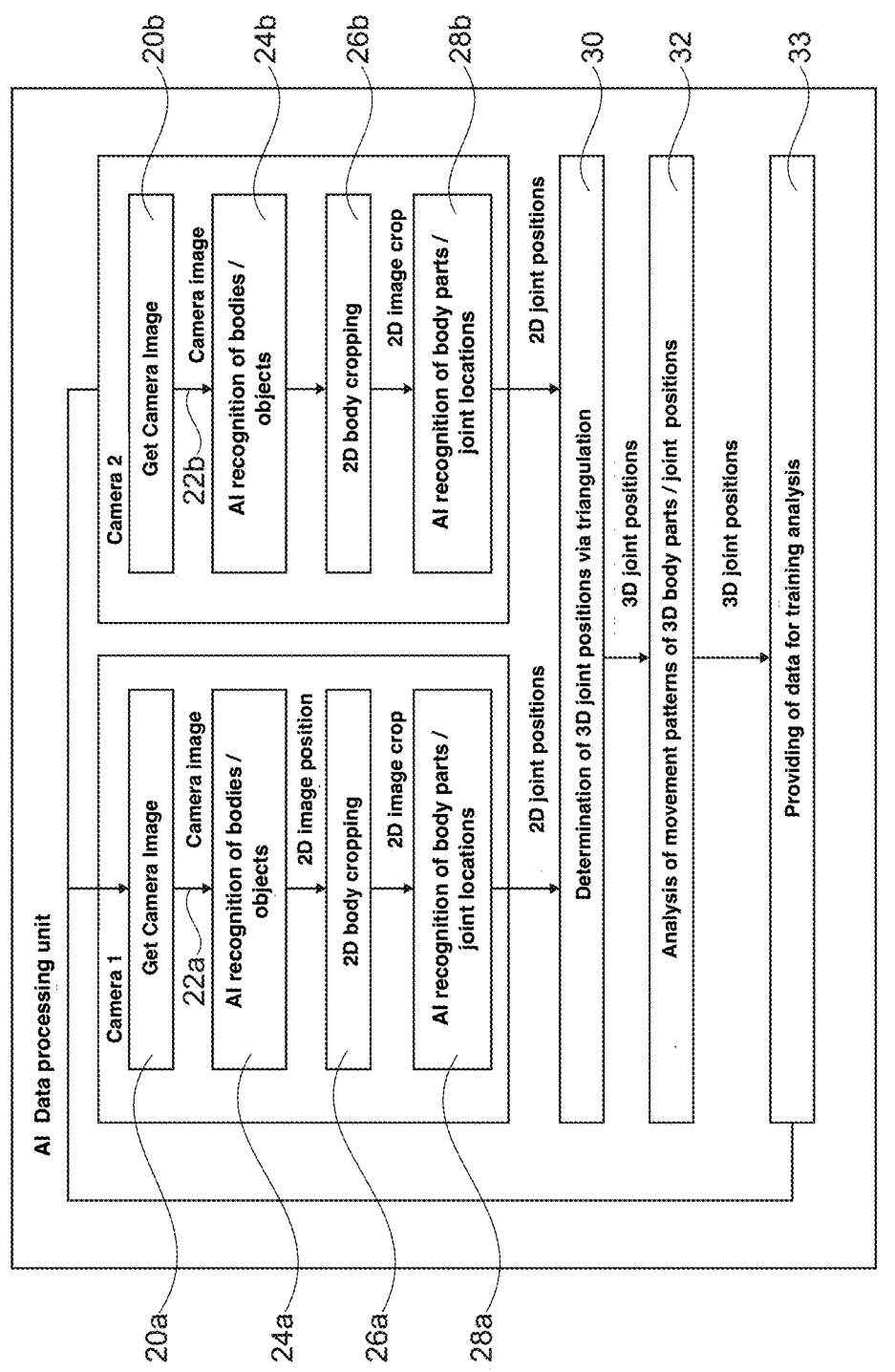
FIG. 3A shows a flow chart of the method.

FIG. 3A shows a flow chart of the method according to a preferred embodiment of the invention. Two cameras with a fisheye lens are provided at a specifically selected distance and position relative to the movement area, each of which is used to capture a 2D image in steps 20a, 20b. In the next step 22a, 22b, the captured image is fed to an AI for recognizing bodies, body parts and/or joints, surfaces and objects, whereby bodies/objects are first recognized on camera images at 24a, 24b, i.e. the 2D image position of these is determined. In a next step 26a, 26b, the recognized bodies and/or objects are cropped and then fed to a further AI for determining the 2D positions of the bodies, body parts and/or joints, surfaces and objects in a further step 28a, 28b. Only when this step has been completed are the previously parallel process steps combined and the 3D positions of bodies, joints, surfaces and objects in space determined by triangulation in step 30 on the basis of the data calculated in the previous steps, and the movement sequences of the 3D body part, joint and/or object positions analyzed in the next step 32. In a final step 33, the calculated data is then made available for exercise evaluation.

Figure 3B:
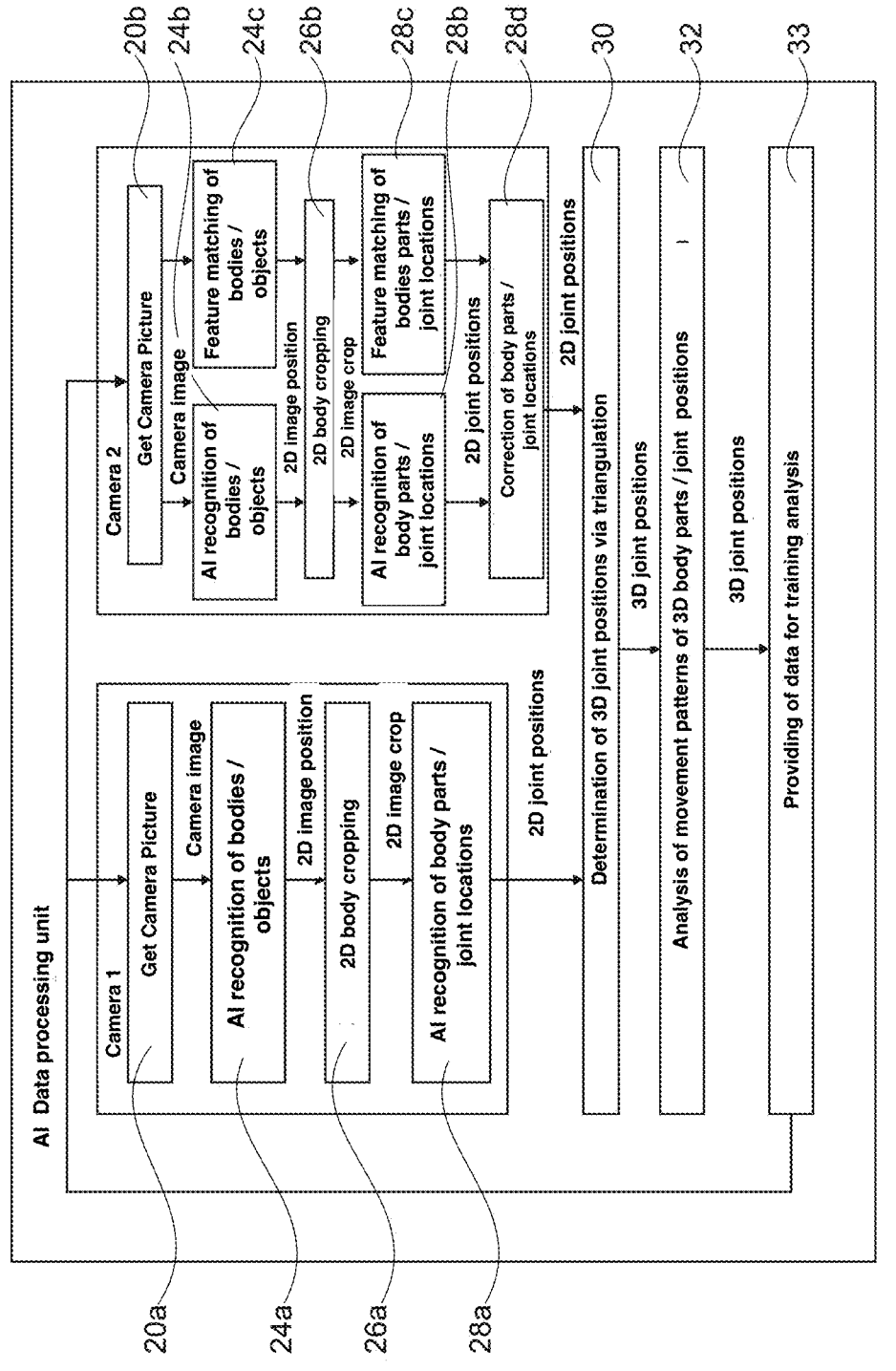
FIG. 3B shows a flow chart of a variant of the method according to FIG. 3A

FIG. 3B shows the flow chart of a variant of the process according to FIG. 3A. The captured image is fed to an AI for feature matching of bodies and/or objects in an additional, parallel step 22c, before the recognized bodies and/or objects are cropped in the next step 26b and then fed to another AI on the one hand to another AI for determining the 2D positions of the bodies, body parts and/or joints, surfaces and objects in step 28b and on the other hand in a step 28c to another AI for renewed feature matching of bodies and/or objects. After steps 28b and 28c, body part and/or joint positions are then corrected in an additional step 28d by merging the AI data from steps 28b and 28c, whereupon the parallel process strands are then combined again and the 3D positions of bodies, joints, surfaces and objects in space are determined by triangulation in step 30 on the basis of the data calculated in the previous steps, and the movement sequences of the 3D body part, joint and/or object positions are analyzed in the next step 32 and the calculated data are then made available for exercise evaluation in the final step 33.

Figure 4:
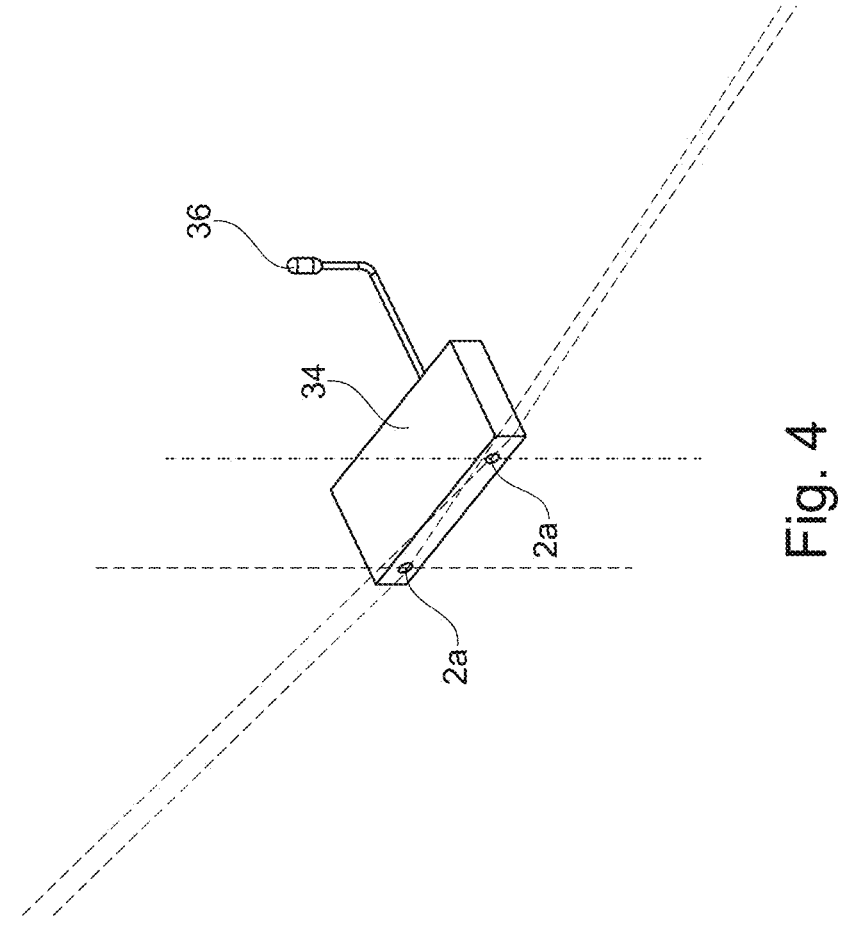
FIG. 4 shows a schematic representation of an embodiment of the device.

Finally, FIG. 4 shows a schematic representation of an embodiment of the device, with a housing 34 in which cameras 2 with fisheye lenses are arranged in the front at a distance specifically selected for the application, the fields of view or Field of View of which are diagonally 220° as well as 180° horizontally and 180° vertically and intersect, as shown by the dotted lines. A data processing unit (not shown) is also provided in the housing 34 with devices for calculating neural networks and artificial intelligence in real time, for determining 2D positions of the bodies, body parts and/or joints, surfaces and objects by means of camera images captured by the cameras 2, Recognition and cropping of bodies/objects on camera images, recognition of body part/joint and/or object positions on image sections, determination of the 3-dimensional positions of the recognized body part/joint and/or object positions, analysis of the movement sequences of the recognized 3-dimensional body part, joint and/or object positions, wherein the output of data or audio/video feedback, on recognition/analysis results calculated from the camera images, is output by means of an audio/video feedback unit (not shown), preferably a high-resolution screen with high-quality speakers. This audio/video feedback unit is controlled via a conventional connection 36, such as USB or similar.

The foregoing description of the preferred embodiment of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiment was chosen and described in order to explain the principles of the disclosure and its practical application to enable one skilled in the art to utilize the disclosure in various embodiments as are suited to the particular use contemplated. It is intended that the scope of the disclosure be defined by the claims appended hereto, and their equivalents. The entirety of each of the aforementioned documents is incorporated by reference herein.

What is claimed is:

1. A method for optical recognition and analysis of bodies, body parts and/or joints of a person, surfaces and objects in 3-dimensional space in a motion range in real time, comprising the following steps:
   a. Providing one or more cameras with fisheye lens,
   b. Arranging the one or more cameras at a distance and position from the movement area specifically selected for the application,
   c. Providing at least one data processing unit equipped with devices for calculating neural networks and artificial intelligences in real time,
   d. Providing at least one audio/video feedback unit,
   e. Determining a 2D positions of bodies, body parts and/or joints, surfaces and objects using camera images on the respective camera or cameras,
   f. Applying several AIs to captured camera images for recognition and/or analysis with the steps
      i. Recognizing and cropping bodies/objects on camera images,
      ii. Recognizing body part/joint and/or object positions on image crops,
      iii. Determination of the 3-dimensional positions of the recognized body part, joint and/or object positions in the movement area,
      iv. Analyzing the movement of the 3-dimensional body part/joint and/or object positions in the movement area,
   g. Outputting data or audio/video feedback on the analysis results using the audio/video feedback unit,
   wherein
      the AIs comprise object recognition AIs and wherein determining the 2D positions of the bodies, body parts, joints and/or surfaces and objects in the range of motion by camera images on the respective camera or cameras comprises the following steps:
   h. Preparing the camera images for input into the object recognition AI by reducing the size of the images using GPU (Graphic Processor Unit) acceleration,
   i. Cropping of bodies, joints, body parts and/or objects, correction of the orientation and scaling of the image section size using GPU acceleration,
   j. Recognizing body part and/or joint positions on the image sections of the bodies by means of further object recognition AIs that are trained to recognize body parts and joints, and
   k. Reverse calculating the detected 2D body parts and/or joint points to the original image size and orientation of the camera image.

2. The method according to claim 1, wherein the determination of the 3-dimensional positions of the detected body part/joint and/or object positions in the range of motion is carried out by 3D real-time estimation.

3. The method according to claim 1, wherein at least two cameras with fisheye lens are provided and the determination of the 3-dimensional positions of the recognized body part, joint and/or object positions in the range of motion is carried out by triangulation.

4. The method according to claim 1, wherein the at least one camera with fisheye lens has a diagonal field of view (FOV) of at least 220°.

5. The method according to claim 4, wherein the at least one camera with a fisheye lens has a field of view of up to 180° horizontally and 180° vertically.

6. The method according to claim 1, wherein the distance and position of the one or more cameras specifically selected for the application is chosen to cover the area in front of the camera or cameras in a radius of up to 10 meters.

7. The method according to claim 1, wherein, when using several cameras, the body parts and joints are additionally recognized by means of feature matching, wherein the joint points recognized by the AIs are searched for by a first camera by means of feature matching on all further cameras.

8. The method according to claim 7, wherein the projection of the epipolar line of the first camera is calculated on all further cameras to minimize the computational effort and areas to be analyzed are defined, wherein the feature matching of the respectively detected joint point takes place along these epipolar line areas.

9. The method according to claim 3, wherein the recognition of 3-D surfaces is carried out using a further AI, which receives two camera images as input and creates a spatial model from them.

10. The method according to any claim 1, wherein the object recognition AI is provided with data on the relations of human joints to each other and performs a pose correction.

11. The method according to any claim 3, wherein the cameras are arranged such that their fields of view intersect.

12. The method according to claim 1, wherein a second data processing unit with graphics processors is provided for controlling games and sports programs based on the 3D data with the body, joints, objects, surfaces and for displaying the feedback by means of the audio/video feedback unit.

13. A device for carrying out a method for optical recognition and analysis, in particular of bodies, body parts and/or joints of a person, surfaces and objects in the 3-dimensional motion range in real time, comprising:

a. a housing;

b. one or more cameras (2) with fisheye lens (3), which are arranged in the housing (34) at a distance and position from the movement area specifically selected for the application, for determining 2D positions of the bodies, body parts and/or joints, surfaces and objects in the motion area by means of camera images;

c. at least one data processing unit provided with means for calculating neural networks and artificial intelligences in real time, for applying several AIs to captured camera images for recognition and/or analysis, comprising the steps of i. Recognizing and cropping bodies/objects on camera images;

ii. Recognizing body parts, joints and/or object positions on image sections;

iii. Determining the 3-dimensional positions of the recognized body part, joint and/or object positions;

iv. Analyzing the movement of the 3-dimensional body part, joint and/or object positions; and d. at least one interface for one or more audio/video feedback units for outputting data or audio/video feedback on the analysis results by means of the audio/video feedback unit, wherein the AIs comprise object recognition AIs for determining 2D positions of the bodies, body parts, joints and/or surfaces and objects by camera images on the respective camera or cameras (2) by means of the following steps:

e. Preparing the camera images for input into the object recognition AI, by reducing the size of the images using GPU (Graphic Processor Unit) acceleration, f. Cropping of bodies, joints, body parts and/or objects, correction of the orientation and scaling of the image section size using GPU acceleration, g. Recognizing body part and/or joint positions on the image sections of the bodies by means of further object recognition AIs that are trained to recognize body parts and joints, and h. Reverse calculating the detected 2D body part and/or joint points to the original image size and orientation of the camera image.

14. The device according to claim 13, wherein at least two cameras (2) with fisheye lens are provided for determining the 3-dimensional positions of the recognized body part, joint and/or object positions in the motion range by triangulation.

15. The device according to claim 13, wherein the at least one camera with fisheye lens has a diagonal field of view (FOV) of up to 220°.

16. The device according to claim 13, wherein the at least one camera with fisheye lens has a field of view of up to 180° horizontally and 180° vertically.

17. The device according to claim 13, wherein the distance and position of the one or more cameras in the housing specifically selected for the application is chosen to cover the movement space in front of the one or more cameras in a radius of up to 10 meters.

18. The device according to claim 13, wherein the object recognition AI is provided with data on the relations of human joints to each other and performs a pose correction.

19. The device according to claim 13, wherein the cameras are arranged in the housing in such a way that their fields of view intersect.

\* \* \* \* \*